United States Patent [19]

Hall

[11] Patent Number: 5,388,040
[45] Date of Patent: Feb. 7, 1995

[54] SERIES RESONANT CONVERTER HAVING AN ACTIVELY CONTROLLED THIRD ELEMENT

[75] Inventor: John T. Hall, Woodland Hills, Calif.

[73] Assignee: Hughes Aircraft Company, Los Angeles, Calif.

[21] Appl. No.: 130,063

[22] Filed: Sep. 30, 1993

[51] Int. Cl.$^6$ .......................................... H02M 3/335
[52] U.S. Cl. ...................................... 363/16; 323/282
[58] Field of Search ............................... 363/15–17, 363/74, 75, 78, 80, 97, 98, 131, 132; 323/281, 282, 290

[56] References Cited

U.S. PATENT DOCUMENTS

| | | | |
|---|---|---|---|
| 4,301,398 | 11/1981 | Johnson | 363/57 |
| 4,342,076 | 7/1982 | Rosswurm et al. | 363/56 |
| 4,648,017 | 3/1987 | Nerone | 363/80 |
| 4,761,727 | 8/1988 | Kammiller | 363/98 |
| 4,926,302 | 5/1990 | Harada et al. | 363/16 |
| 5,172,308 | 12/1992 | Tohya | 363/16 |
| 5,293,111 | 3/1994 | Weinberg | 363/282 |
| 5,317,494 | 5/1994 | Noro | 363/282 |

OTHER PUBLICATIONS

"Topologies For Three Element Resonant Converters", R. Severns, published in APEC, 1990, pp. 712–722.

"A Comparison of Half-Bridges Resonant Converter Topologies", R. L. Steigerwald, IEEE Transactions on Power Electronics, vol. 3, No. 2, Apr. 1988, pp. 174–182.

*Primary Examiner*—Steven L. Stephan
*Assistant Examiner*—Matthew Nguyen
*Attorney, Agent, or Firm*—L. A. Alkov; W. K. Denson-Low

[57] ABSTRACT

A series resonant converter comprising an actively-controlled third element, or actively-controlled resonant preload. The actively-controlled third element is controlled by logic that makes it operative only when it is required by load conditions, and thus the desired characteristics of the third element are only employed when needed. The present invention incorporates the actively-controlled reactive preload and which operates on demand, and results in a converter output that is able to regulate from no load to full load. The third element is operated on demand and only at low power levels, and there is no penalty of higher RMS current in the power chain. The present invention is particularly applicable for use in charging batteries used in electrical vehicles. With the features provided by the present invention, an induction battery charger is able to use a high efficient resonant power supply, incorporating very low volume and weight coupling transformers, and which operates at high frequency and high power. The present invention may be used with all multi-element resonant converters that utilize more than two elements. The present invention improves on all resonant converters and provides for a more desirable operating characteristics, particularly in the case of load regulation.

7 Claims, 2 Drawing Sheets

SERIES RESONANT CONVERTER HAVING AN ACTIVELY CONTROLLED THIRD ELEMENT

BACKGROUND

The present invention relates generally to resonant converters, and more particularly, to a resonant converter having an actively-controlled resonant preload.

It is generally well known that conventional series resonant converters cannot be operated effectively at no load or minimal load. In an attempt to eliminate this problem, a third element is added to the conventional series resonant converter. A paper entitled "Topologies for Three Element Resonant Converters", by Rudy Sevems, published in APEC, 1990, page 712, references substantially all known resonant converter designs incorporating reactive third elements. This paper discusses two element resonant topologies, and describes how many of the limitations of the two element designs can be overcome by adding the third reactive element.

A paper entitled "A Comparison of Half-Bridge resonant Converter Topologies, by Robert L. Steigerwald" published in IEEE Transactions on Power Electronics, Vol. 3, No. 2, April 1988, discusses half-bridge series resonant, parallel resonant and combination series-parallel resonant converters. This paper indicates that the combination series-parallel converter, which takes on the desirable characteristics of the pure series and the pure parallel converter, and thus removes the main disadvantages of these two converters. It is shown that the combination series-parallel converter can run over a large input voltage range and a large load range (no load to full load) while maintaining excellent efficiency.

Accordingly, it is an objective of the present invention to provide for a resonant converter that is able to effectively regulate from no load to full load.

SUMMARY OF THE INVENTION

In order to provide for the above and other objectives, features and advantages, the present invention improves upon all previous resonant converter designs by adding an actively-controlled third element, comprising an actively-controlled resonant preload, to a series resonant converter. The actively-controlled third element provided by the present invention is made operative only when it is required by load conditions, and thus the desirable characteristics of the third element are only employed when they are needed.

More specifically, the present invention may be employed in a series resonant converter comprising a switch, a main transformer having a primary and secondary windings, first and second reactive elements coupled in series with the primary winding of the main transformer, a load coupled across a secondary winding of the transformer, a third reactive element coupled across the primary winding of the transformer, and drive circuitry coupled to the switch. The improvement provided by the present invention comprises a current sensing transformer coupled in series with the primary winding of the main transformer, a switch coupled in series with the third reactive element, and control logic coupled between the current sensing transformer and the switch for determining a low load condition and for turning on the switch in response thereto. The control logic typically comprises a plurality of pairs of series coupled diodes and a resistor coupled in parallel with the plurality of pairs of diodes that are adapted to rectify the current sensed by the current sensing transformer and convert this current to a DC voltage, and a comparator coupled to receive the DC voltage and a reference voltage that is adapted to compare these two voltages and provide an output signal that controls the switching of the switch in the event of a low load condition.

The comparator is adapted to turn off the AC switch when the input current is above a predetermined minimum current set by the reference signal. The size of the proportional current signal is determined by the turns ratio of the current sensing transformer. The proportionality of the current signal is on the order of 50:1, in that the current produced by the current sensing transformer is 1/50 of the current of the main transformer. The third reactive element may comprise an inductor. The switch is typically a plurality of semiconductor switches that comprise semiconductor power field effect transistors.

The present invention provides for the incorporation of the actively-controlled reactive preload into the series resonant converter that operates on-demand, and results in a converter output that is able to regulate from no load to full load. The novel idea of the present invention is the on-demand feature of the reactive preload. As was mentioned above, series resonant converters cannot be operated effectively at no load or minimal load. By adding a third element to the series resonant converter, its operating deficiency (i.e. poor load regulation) can be cured. However, this is achieved with a penalty of higher RMS current in the power chain. However, and in accordance with the present invention, by adding a third element that is operated on-demand (only at low power levels), the RMS current penalty of the conventional third element design is eliminated.

The present invention is particularly applicable for use in charging batteries used in electrical vehicles. With the features provided by the present invention, an induction battery charger is able to use a high efficient resonant power supply, incorporating very low volume and weight coupling transformers, and which operates at high frequency and high power. The present invention may be used with all multi-element resonant converters that utilize more than two elements.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
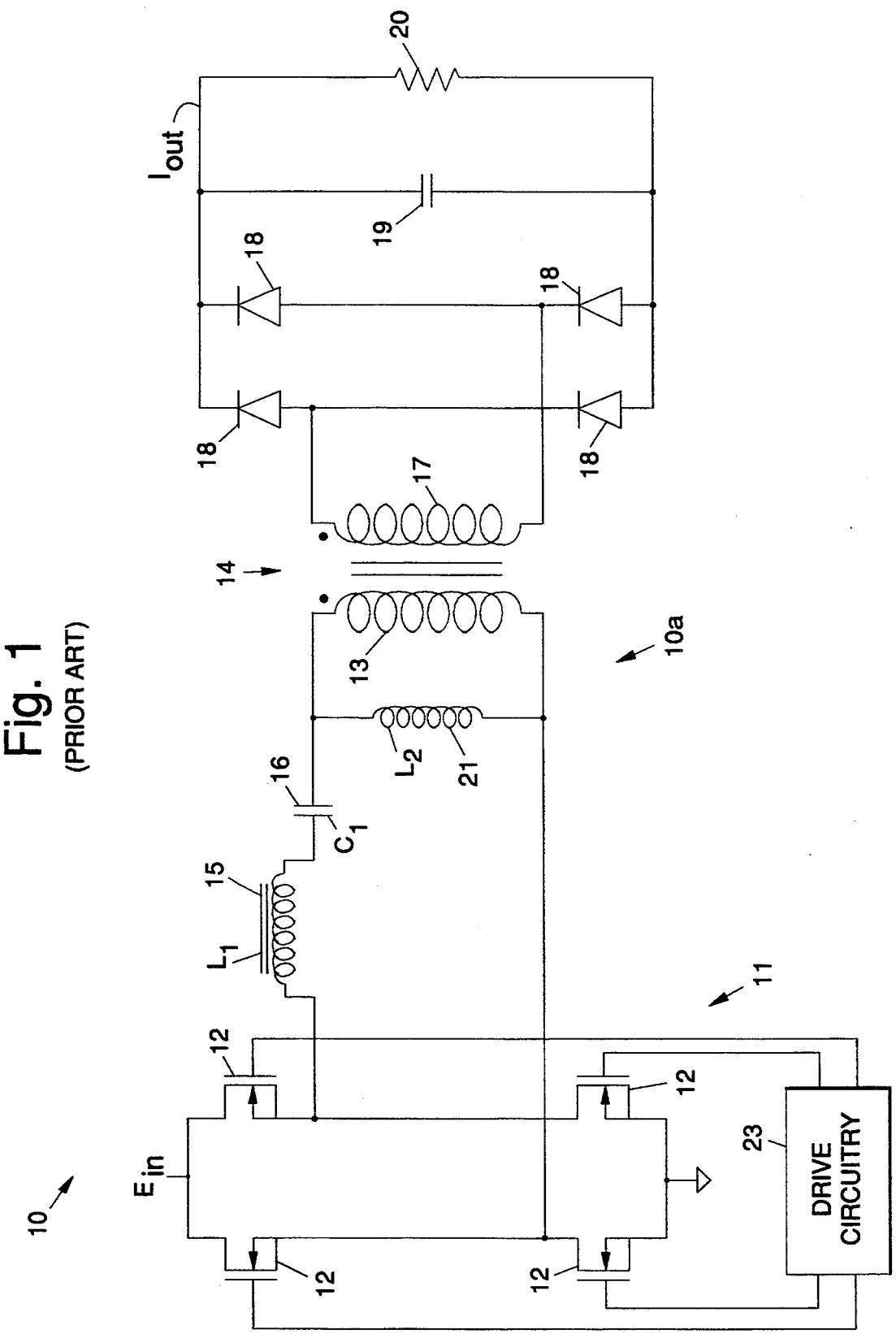
FIG. 1 shows conventional two-element and three-element resonant converters.

Referring to the drawing figures, FIG. 1 shows conventional two-element and three-element resonant converters 10, 10a. Without the addition of the third element, this circuit illustrates a classical series resonant converter.

The conventional resonant converter 10, 10a comprises a switch 11, which may be provided by a plurality of semiconductor power switches 12, such as field effect transistors (FETs), for example. The switch 11 drives a primary winding 13 of a transformer 14. The switching of the plurality of semiconductor power switches 12 is controlled by a drive circuit 23. In the conventional two-element series resonant converter 10, first and second elements, comprising an inductor 15 and a capacitor 16, respectively, are coupled in series with the primary winding 13 of the transformer 14. The transformer 14 has a secondary winding 17 that is coupled to a load 20 by way of a plurality of diodes 18 and a filter capacitor 19.

The current in the conventional two-element converter 10 is expressed as:

$$I_{out} = \frac{8}{\pi^2} \left( \frac{1}{z_0} \right) \left( \frac{f_n}{f_n^2 - 1} \right) (E_{in} - E_{out}^2)^{\frac{1}{2}}$$

where $z_0 = \sqrt{L_1/C_1}$. As is illustrated from this equation, the main disadvantage of the two-element series resonant converter 10 is that the output voltage cannot be regulated for a no-load case. Reference is made to the paper "A Comparison of Half-Bridge Resonant Converter Topologies", by Robert Steigerwald, IEEE Transactions on Power Electronic, Volume 3, No. 2, April 1986, which discusses this deficiency.

However, the two-element series resonant converter 10 is a highly desirable topology for high voltage and high power, due to its ability to provide sine wave current to the transformer 14, resulting in low harmonic losses, as compared to square wave current. Consequently, a smaller transformer 14 may be used, resulting lower losses due to the use of less copper in the transformer 14. There is no core saturation at blocking capacitor caused by the primary winding 13. Also this converter 10 is very robust for stray inductance of wire and the transformer 14, and overcurrent due to the series inductor 15 on the primary winding 14.

The deficiency of the series resonant converter 10 is overcome by the addition of a third element 21 to the topology, as is also shown in FIG. 1, illustrated by the three-element converter 10a. The third element 21, comprising a second inductor 21, allows the resonant converter 10a to operate at substantially no load. This conventional modified converter 10a incorporating the third element 21 is used as a current regulator.

For the three-element converter 10a shown in FIG. 1, $$f_n = \sqrt{\frac{f_{operation}}{f_{resonant}}} \text{ and}$$

$$I_{out} = \frac{8}{\pi^2} \left( \frac{1}{z_0} \right) \left( \frac{f_n}{f_n^2 - 1} \right) \left( E_{in} - \left( \frac{1}{a} \left( a + 1 - \frac{1}{f_n^2} \right) \right)^2 E_{out}^2 \right)^{\frac{1}{2}}$$

where $a = L_2/2_1$, and $f_{resonant} = \frac{1}{2}\pi\sqrt{L_1/C_1}$.

As can be seen from this equation, by adjusting the "a" term in the above equation, that is, the ratio of $L_2$ to $L_1$, $I_{out}$ can be reduced to zero, or can regulate to a no load condition. However, for this to occur, $L_2$ may be up to two times the $L_1$ value, resulting in larger RMS current flowing in the inductor 15 and capacitor 16 ($L_1$, $C_1$), the switches 12 and the transformer 14. Thus, the efficiency of the three-element converter 10a is compromised and the size of the transformer 14 is increased over the conventional two-element converter 10.

Figure 2:
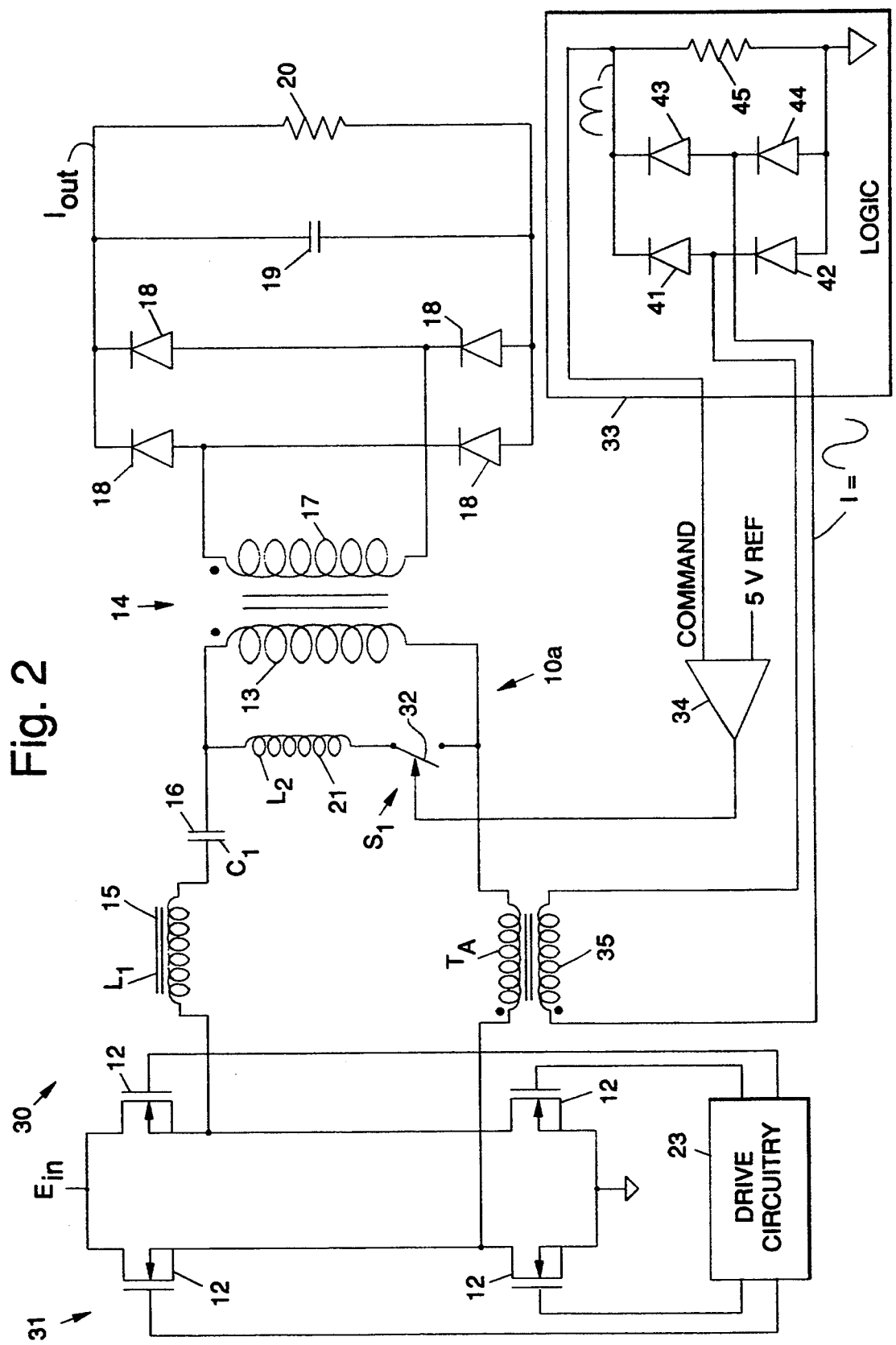
FIG. 2 shows an embodiment of a three-element resonant converter incorporating an actively-controlled resonant preload and control logic in accordance with the principles of the present invention.

The solution to this problem is a realization that the third element 21, comprising the second inductor 21, is only required at low load currents. This is provided for in a manner as is shown in FIG. 2, which illustrates a three-element converter 30 comprising an activity-controlled resonant preload 31 in accordance with the principles of the present invention. The activity-controlled resonant preload 31 comprises an AC switch 32 is inserted in series with the third element 21 ($L_2$). Logic 33 including a comparator 34 and a sensing transformer 35 ($T_A$) is provided that determines when a minimal load condition occurs, and turns on the AC switch 32 ($S_1$), thus coupling the third element 21 ($L_2$) into the circuit 30, allowing no load operation.

The logic 33 and comparator 34 are coupled between the sensing transformer 35 ($T_A$) and the AC switch 32 in a conventional manner. The logic 33 is comprised of the current sensing transformer 35 ($T_A$) which is adapted to sense the current flowing through the primary winding 13 of the transformer 14. The current sensing transformer 35 ($T_A$) provides a current signal proportional to the current in the main transformer 14 that is rectified and converted to DC by four diodes 41–44 and a resistor 45. The size of the proportional current signal is based on the turns ratio of the current sensing transformer 35 ($T_A$). Typically, the proportionality is on the order of 50:1, in that the current produced by the current sensing transformer 35 ($T_A$) is 1/50 of the current of the main transformer 14. The resistor 45 is chosen to provide the correct voltage to be compared to the 5 volt reference voltage applied to the comparator 34. When the input current is above the minimum required, set by the 5 volt reference signal, the comparator 34 turns off the AC switch 32.

Thus there has been described a new and improved resonant converter having an actively-controlled resonant preload. The concepts of the present invention are global, in that the principles of the present invention may be applied to all third and fourth element resonant converter designs. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. In a series resonant converter comprising a switching element, a main transformer having a primary and secondary winding, first and second reactive elements coupled in series with the primary winding of the main transformer, a load coupled across a secondary winding of the main transformer, a third reactive element coupled across the primary winding of the main transformer, and drive circuitry coupled to the switching element, wherein the improvement comprises:
- a current sensing transformer coupled in series with the primary winding of the main transformer;
- an AC switch coupled in series with the third reactive element; and
- logic means coupled between the current sensing transformer and the AC switch for determining a low load condition and for turning on the AC switch in response thereto, wherein the logic means comprises:
  (i) a plurality of pairs of series coupled diodes and a resistor coupled in parallel with the plurality of pairs of diodes that are adapted to rectify the current sensed by the current sensing transformer and convert this current to a DC voltage, and
  (ii) a comparator coupled to receive the DC voltage and a reference voltage that is adapted to compare these two voltages and provide an output signal that controls the switching of the AC switch in the event of a low load condition.

2. The series resonant converter of claim 1 wherein the comparator is adapted to turn off the AC switch when the input current is above a predetermined minimum current set by the reference voltage.

3. The series resonant converter of claim 1 wherein the size of the proportional current signal is determined by the turns ratio of the current sensing transformer.

4. The series resonant converter of claim 3 wherein the proportionality of the current signal is on the order of 50:1, in that the current produced by the current sensing transformer is 1/50 of the current of the main transformer.

5. The series resonant converter of claim 1 wherein the third reactive element comprises an inductor.

6. The series resonant converter of claim 1 wherein the switching element comprises a plurality of semiconductor switches.

7. The series resonant converter of claim 6 wherein the semiconductor switches comprises semiconductor power field effect transistors.

* * * * *